US007198316B2

(12) United States Patent
Lutzka et al.

(10) Patent No.: US 7,198,316 B2
(45) Date of Patent: Apr. 3, 2007

(54) FLOOR RELEASE LATCH MECHANISM FOR A VEHICLE SEAT INTERCONNECTED WITH A SECONDARY RELEASE ASSOCIATED WITH A ROTATABLE SEAT BACK

(75) Inventors: Tavis S. Lutzka, Clawson, MI (US); Keith Brantley, Utica, MI (US)

(73) Assignee: BAE Industries, Inc., Centerline, MI (US)

( * ) Notice: Subject to any disclaimer, the term of this patent is extended or adjusted under 35 U.S.C. 154(b) by 29 days.

(21) Appl. No.: 11/120,364

(22) Filed: May 3, 2005

(65) Prior Publication Data

US 2006/0125274 A1    Jun. 15, 2006

Related U.S. Application Data

(63) Continuation-in-part of application No. 11/013,170, filed on Dec. 15, 2004.

(51) Int. Cl.
*B60N 2/10* (2006.01)
*B60N 2/20* (2006.01)

(52) U.S. Cl. ............................. 296/65.03; 296/65.09; 297/336

(58) Field of Classification Search ............. 296/65.03, 296/65.09, 65.16; 297/336
See application file for complete search history.

(56) References Cited

U.S. PATENT DOCUMENTS

| 4,700,989 A * | 10/1987 | Ercilla ....................... 297/331 |
| 5,224,750 A | 7/1993 | Clark et al. ................ 296/65.1 |
| 5,393,116 A * | 2/1995 | Bolsworth et al. ........ 296/65.03 |
| 5,482,345 A * | 1/1996 | Bolsworth et al. ........ 296/65.03 |
| 5,547,242 A | 8/1996 | Dukatz et al. ............. 296/65.1 |
| 5,577,805 A * | 11/1996 | Glinter et al. ......... 297/378.12 |
| 5,904,404 A | 5/1999 | McCulloch et al. ... 297/378.12 |
| 6,039,401 A | 3/2000 | Rus ...................... 297/378.13 |
| 6,213,525 B1 | 4/2001 | Nicola ....................... 292/223 |
| 6,290,297 B1 * | 9/2001 | Yu ........................ 297/378.12 |
| 6,345,867 B1 * | 2/2002 | Hellrung et al. ............ 297/336 |
| 6,412,849 B1 | 7/2002 | Fast ........................ 296/65.03 |
| 6,644,744 B2 | 11/2003 | Seibold ....................... 297/335 |
| 6,698,837 B2 * | 3/2004 | Pejathaya et al. ...... 297/378.12 |
| 6,910,739 B2 * | 6/2005 | Grable et al. .......... 297/378.12 |
| 2004/0174037 A1 | 9/2004 | Frazier et al. ........... 296/65.09 |
| 2004/0183327 A1 | 9/2004 | Yokoyama ............... 296/65.03 |

* cited by examiner

*Primary Examiner*—Dennis H. Pedder
(74) *Attorney, Agent, or Firm*—Gifford, Krass, Groh, Sprinkle, Anderson & Citkowski, P.C.

(57) ABSTRACT

A combined seat back release and floor release for use with a vehicle seat. The seat back includes a first mechanism for forwardly rotating a seat back relative to a seat bottom. The floor release is actuated by the seat back by virtue of a linearly translatable cable extending therebetween. The cable acts upon a floor release lever, which is rotatably slaved to a pair of cam elements. A latch plate is rotatably secured to the seat and engages a floor mounted striker. Shoulder portions associated with the cams define primary and secondary abutment surfaces acting against the support surface of the latch plate. The lever actuates the cams away from the support surface in response to the actuation of the cable from the seat back mechanism. Forward pivoting of the seat occurs upon the cam shoulders separating from the latch plate support surface, a coil spring causing the latch plate to further rotate in a disengaging direction relative to the striker and upon the coil spring exceeding an over center portion relative to the pivot point of rotation of the latch plate.

18 Claims, 7 Drawing Sheets

FLOOR RELEASE LATCH MECHANISM FOR A VEHICLE SEAT INTERCONNECTED WITH A SECONDARY RELEASE ASSOCIATED WITH A ROTATABLE SEAT BACK

CROSS REFERENCE TO RELATED APPLICATIONS

The present application is a continuation-in-part of U.S. patent application Ser. No. 11/013,170, filed Dec. 15, 2004, for a Floor Release Latch Mechanism for a Vehicle Seat.

BACKGROUND OF THE INVENTION

1. Field of the Invention

The present invention relates generally to latching mechanisms for vehicle seats. More specifically, the present invention discloses combined seat back and floor release latch mechanisms for use with a pivoting vehicle seat and by which forward pivoting of the seat back causes an interconnecting cable to disengage the floor release latch mechanism from an associated floor mounted striker.

2. Description of the Prior Art

The prior art is well documented with examples of latch assemblies in use with a vehicle seat. The objective in each instance is to provide for secured engagement and disengagement of the latch assembly to and from a fixed location, such as a floor mounted striker plate, and in order to permit an associated vehicle seat to be dumped/pivoted forwardly and/or removed from the vehicle.

U.S. Pat. No. 6,412,849, issued to Fast, teaches a chuck-free latch assembly including both fixed and movable members, as well as a striker fixed to one of the movable and fixed members. The latch assembly is adapted to be connectable to the other of the movable and fixed members and to selectively couple the movable member to the striker. More specifically, the latch assembly includes a housing, latch and a release cam coupled to the housing, along with spring means and a release mechanism.

The housing includes a striker opening adapted to accommodate the floor secured striker. The latch is operable in a latched position when the latch assembly is in a latched mode wherein the latch is adapted to couple the striker to the housing and in an unlatched position when the latch assembly is in an unlatched mode, wherein the striker is freely movable relative to the housing. The release cam is operable in an engaged position wherein the release cam urges the latch towards its latched position and in a released position wherein the latch is operable in its unlatched position. The spring means urges the release cam toward its engaged position and the latch toward its unlatched position. Finally, the release mechanism is operable for selectively moving the release cam from its engaged position to its released position.

Rus, U.S. Pat. No. 6,039,401, discloses a latch mechanism which removably attaches a front portion of a collapsible and removable utility seat assembly to a latch rod on a vehicle floor pan. The latch mechanism includes a bracket adapted for attachment to the front portion of the utility seat assembly with a wheel attached thereto. The latch mechanism also includes a lock member rotatably connected to the bracket and adapted for engagement with the floor pan for causing rotation of the lock member with respect to the bracket to facilitate locking of the locking mechanism onto the latch rod as the utility seat assembly is collapsed.

Frazier, U.S. Patent Publication No. 2004/0174037, teaches a seat assembly which selectively engages forward and rearward strikers positioned along a floor of a motor vehicle. The seat assembly includes a seat cushion and a seat back pivotally coupled to the seat cushion. The seat assembly also includes a seat riser mounted to the seat cushion and including spaced-apart rear legs. The seat riser includes rear latches operatively coupled to each of the rear legs for movement between a latched position engaged with the rear latches and an unlatched position disengaged from the rear latches. A spring assist member includes a lever portion extending between a first end fixedly secured to said rear leg and an opposite second distal end for engaging the rearward striker to assist in pivoting the seat assembly about the forward strikers as the rear latches release the rearward strikers in the unlatched position.

U.S. Pat. No. 5,224,750, issued to Clark et al., teaches a pivotal seat structure for a vehicle body and including a seat back connected to a seat cushion. The seat cushion is secured to a frame member which is pivotally mounted on the seat riser. A latch assembly is operably connected between the seat riser and the seat cushion frame member. A latch release rod is operably connected to the latch assembly. A gas spring is operably connected between the seat riser and the seat cushion frame member, the frame member, seat cushion and the seat back adapted to being pivoted forwardly off of the riser by the gas spring upon manual actuation of the latch release rod.

Finally, U.S. Pat. No. 6,213,525, issued to Nicola, discloses a lever action floor latch actuation mechanism for removing a seat to a pair of front and rear strikers located on the floor of a vehicle. A riser having a forward leg and a rearward leg supports the seat above the vehicle floor. Front and rear latches are pivotally connected to the forward and rearward legs, respectively, for releasably securing the seat to the strikers. A longitudinal links pivotally interconnects the front and rear latches and an actuation member coupled to the link simultaneously moves the latches between a latched position engaging the strikers and an unlatched position disengaging the strikers.

Each latch includes a cinch cam pivotally connecting the latch to the riser. The cinch cam has a cylindrical outer surface terminating at a flattened cam surface. A spacer plate is fixedly secured between the latch and the riser and includes a center aperture for rotatably receiving the cinch cam. The aperture forms a circular section and a tangential slot for seating a flexible plate. The cylindrical surface of the cam engages and flexes the plate when the latch is pivoted to the latched position providing an anti-rattle biasing force between the latch and striker and the flattened surface releases the flex in the plate when the latch is pivoted to the unlatched position disengaged from the striker.

SUMMARY OF THE PRESENT INVENTION

The present invention discloses combined seat back and floor release latch mechanisms for use with a vehicle seat, and which in particular provides for successive forward pivoting of the seat back combined with forward dump rotation of the seat bottom. The floor release is actuated by a translatable cable assembly extending from the seat back mechanism and which, upon actuation of a lever associated with the seat back causes disengagement of the floor latch mechanism and forward dumping of the vehicle seat, and following the forward pivoting and locking of the seat back relative to the seat bottom. Additionally, the construction of each of the seat back and seat bottom latch mechanisms facilitate easy reengagement of the seat back to the seat bottom, as well as the seat bottom to the floor mounted striker.

Operating the floor release mechanism is the interconnected seat back mechanism for concurrently rotating and locking in place the seat back, relative to the seat bottom. The seat back release is actuated by a flexible and linearly translatable cable assembly connected at a first end to the floor release lever and at a second opposite end to a separate and lever operated seat back release.

The seat back lever is spring biased in a first rotational direction and is actuated in an opposite direction, whereby an intermediately disposed cam element, located between inner and outer support plates and in abutting engagement with the pivotally secured seat back arm in its upright position, is likewise caused to rotate. A projecting ledge associated with the cam acts upon a tab location of the release, causing the release (typically located on an opposite face of an inner support) to rotate in a direction whereby its connected cable is linearly translated.

The opposite cable end is concurrently translated to in turn actuate the lever operating the floor release mechanism. A coil spring interconnects a pivotally offset location of the seat back release to the inner frame support and, upon being fully rotated, biases the release to remain in an end-rotated position whereby its abutment shoulder is maintained in contact with a seat back lock plate, and to further prevent the seat back from being rotated in an opposite direction.

The floor mounted release assembly includes an inner support plate secured to the seat proximate to the floor-supported striker. An outer support plate is secured in spaced-apart fashion relative to the inner support plate, and such as through the use of rivets.

A latch plate is secured in pivotal fashion between the inner and outer support plates. An arcuate configuration in the latch plate defines a recess for receiving the striker in an engaged position. An anti-chuck cam is rotatably secured to a further location associated with the support plate, a shoulder defined in the anti-chuck cam seats against a support surface of the latch plate.

A secondary cam is rotatably secured to the support plate in coaxial fashion relative to the first cam. The secondary cam exhibits a secondary shoulder positioned proximate the primary support shoulder and the latch plate support surface, the cams being biased in an engaging direction against the latch plate.

A coil spring extends between the anti-chuck cam and a location of the latch plate offset from a pivot point of said latch plate. Actuation of a lever secured to an exposed surface of the outer support plate, and through the application of a linearly translatable cable resulting from the actuation of the associated seat back release mechanism, creates a disengaging rotation of the first and second cams.

Upon the shoulders associated with the cams separating from the latch plate support surface, forward pivoting of the seat, such as which is influenced by a spring induced rotational bias located along a front axis associated with the seat bottom, causes the latch plate to rotate out of position relative to the striker. A specified degree of tension exerted on the coil spring corresponds to the latch plate being further rotated to a fully disengaged and restrained position. This typically occurs upon the spring achieving an over-center position relative to the pivotal axis of the latch plate, at which point a pin end of the spring secured to the latch plate traverses along a path formed in the outer support plate to an end-abutting location.

Additional features include an arcuate slot defined in the outer plate, a pin inserting through the slot and securing to the latch plate. As described previously, the spring further typically includes a coil spring with one end connected to the pin and an opposite end secured to an angled bracket portion associated with the anti-chuck cam.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
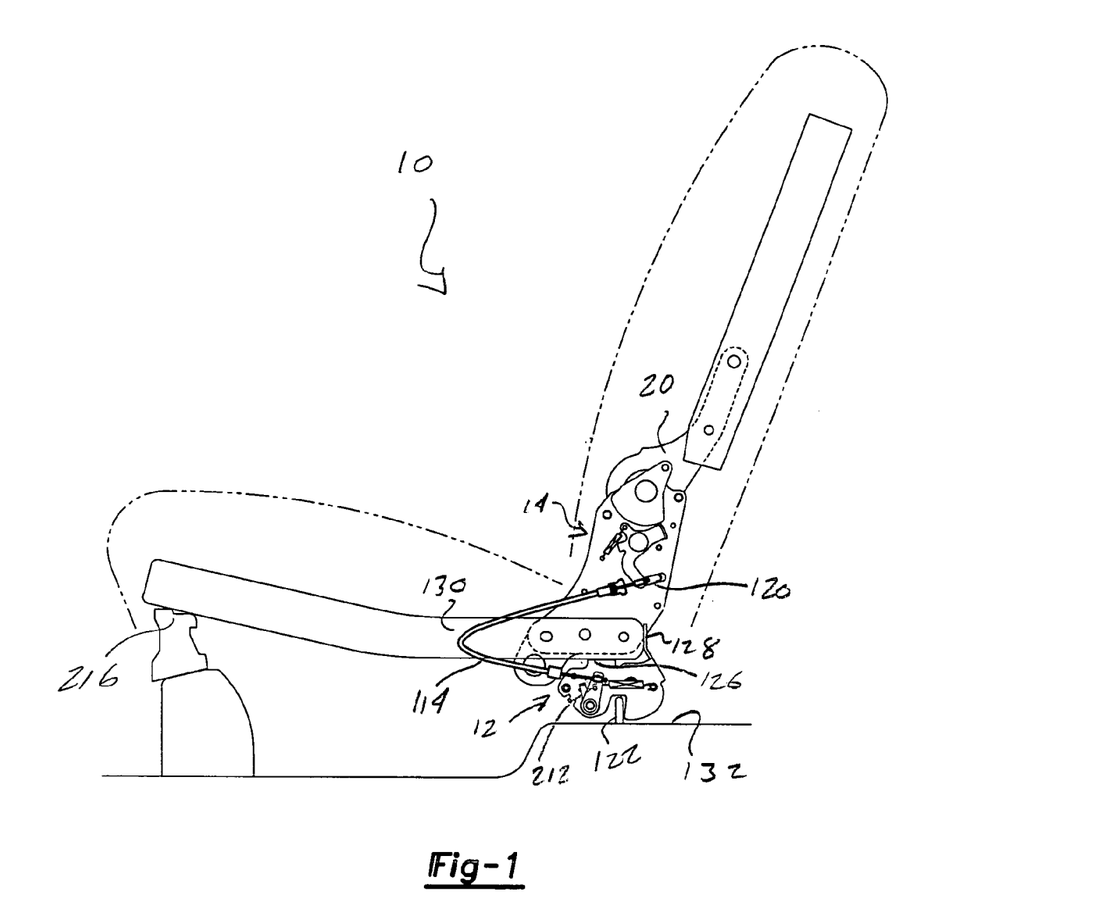
FIG. 1 is a side plan view of the seat according to the present invention and illustrating both the floor latch in an engaged position and seat back in an upright position.

Referring now to FIG. 1, a vehicle release mechanism is generally illustrated at 10 according to the present invention. As will be further described, the release mechanism combines the features of a seat back release mechanism 12 (see also FIG. 2) with a floor latch release mechanism 13 (see also FIG. 3) for rotating a pivotally associated seat back to a forward position and, successively, releasing the floor latch mechanism in order to forwardly rotate the seat bottom to a forward dump position through a linearly translatable cable extending from the seat back release mechanism to a lever operating the floor release mechanism. As will also be described in reference to the several figures, a preferred embodiment contemplates both the seat back and floor release mechanisms provided in pairs, corresponding to opposite sides of the vehicle seat, although other combinations are envisioned within the skill of one in the art.

Figure 2:
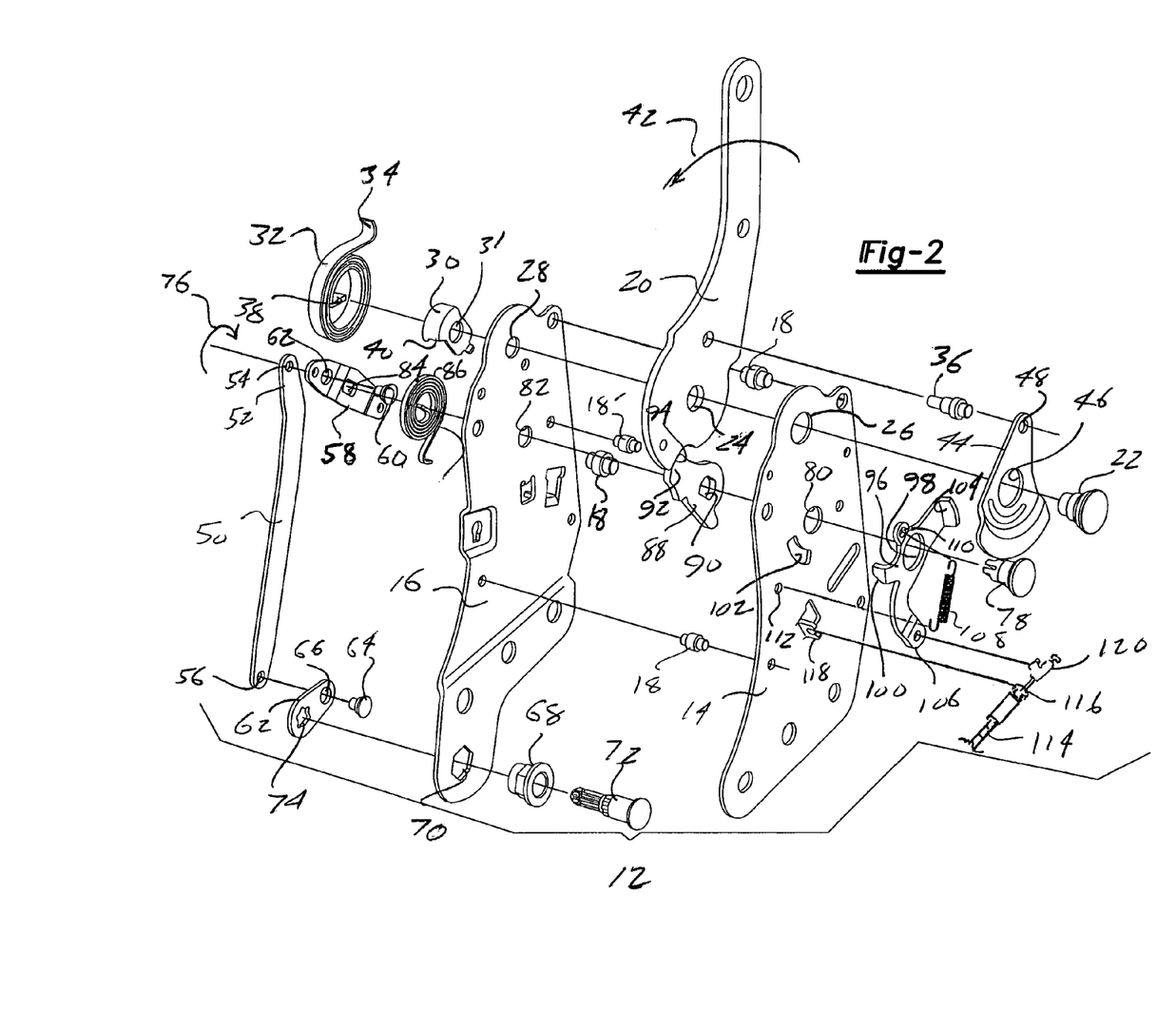
FIG. 2 is an exploded perspective of the associated components of the seat back latch assembly according to the present invention.

Addressing first the seat back release mechanism 12, as best illustrated in exploded perspective fashion in FIG. 2, a pair of inner 14 and outer 16 support plates are illustrated and which are secured in spaced apart and proximate fashion by a plurality of spacer rivets, such as is representatively shown at 18. A seat back arm 20 is pivotally secured between the support plates 14 and 16, by a main pivot pin 22 which extends through an aperture 24 defining a pivot point through the seat back arm 20 and aligning apertures 26 and 28 established through the inner 14 and outer 16 support plates.

A bracket 30 is secured to an exterior surface of the outer plate 16 and includes an aperture 31 through which is seated an outermost extending end of the pivot pin 22. Secured to the bracket 30 is a clock spring 32, an outer curled end 34 thereof biasing against an inserting pin end of a stop rivet 36, whereas an inner curled end 38 abuts against a ledge 40 of the bracket 30. In this fashion, the seat back arm 20 is biased by the clock spring 32 in a forward rotating direction as represented by directional arrow 42 in FIG. 2.

A lock plate 44 is secured against an opposite exterior surface of the inner support plate 14 and likewise includes an aperture 46 through which the main pivot pin 22 is initially engaged and prior to successively seating through the apertures 26, 24, 28 and 31. A further offset aperture 48 is defined in the lock plate 44 and through which is inserted an opposite pin end of the stop rivet 36, the purpose for which being to slave the lock plate 44 to the seat back arm 20, thus causing the lock plate 44 to rotate in unison with the seat back arm 20.

An elongated and substantially flattened linkage element 50 exhibits a generally linear centerline axis, and includes an angled upper end portion 52 terminating in a first aperture 54 and an opposite and lower end portion terminating in a second aperture 56. A seat back lever 58 pivotally engages the upper end of the linkage element 50 by a link rivet 60, which engages through an aperture 62 in the seat back lever 58 and which aligns with the upper end aperture 52 of the linkage element 50.

A spline lever 62 is pivotally secured to the lower end of the linkage element 50 by another link rivet 64 which engages through an aperture 66 in the spline lever 62 and in aligning fashion through the lower end aperture 56 in the linkage element 50. The spline lever 62 is secured to the outer support plate 16 via a hex bushing 68 seating within a hex aperture 70 defined through a bottom end location of the support 16, a spline shaft 72 including an extending end portion which seats through a reduced area hex head configured aperture 74 defined within the spline lever 62 and in order to slave the lever 62 pivotally to the rotation of the spline shaft 72. In this fashion, the linkage element 50 provides interconnecting support to the seat back lever 58 during its subsequent rotation, see directional arrow 76 in FIG. 2.

A pivot assembly associated with the lever 58 includes a pivot pin 78 inserting through aligning apertures 80 and 82 in the supports 14 and 16. A keyed end of the pin 78 engages through a likewise keyed center aperture 84 associated with the lever 58 in order to pivotally slave the rotation of the lever 58. A secondary clock spring 86 is sandwiched between the lever 58 and the opposing face of the support 16, a curled tail end of the clock spring 86 engaging a selected spacer rivet 18' in order to bias the lever 58 in a direction opposite that of the indicated direction 76 of rotation.

Inter-disposed between the inner 14 and outer 16 supports is a cam 88 having a keyed central aperture 90 engaged by the pin 78 and such that the cam 88 is slaved to the motion of the lever 58. The cam 88 is arranged relative the seat back arm 20 such that a projecting ledge portion 92 of the cam 88 engages a corresponding recess curvature 94 associated with a lower arcuate configuration of the seat back arm 20.

Secured to an opposite face of the inner support 14 is a rotatably slaved release 96. A central rounded aperture 98 associated with the release engages a corresponding rounded shaft end portion associated with the pin 78, and such that the release 96 is rotatable independent from the pin 78. Additional features associated with the release 96 include an inwardly angled keyed portion 100, insertable through an arcuate slot 102 defined within the inner support 14 and defining an overall range of rotation associated with the release 96.

Yet additional features include an upper extending end-abutment shoulder 104 (for restraining the seat back arm 20 in the forward rotated position as will be further described) and a lower extending portion 106, to which an associated end of the translating cable extending to the floor release is secured. A coil spring 108 is provided and connects at a first end to a location 100 of the release 96 offset from its central pivot location (see again aperture 98), the spring 108 securing at an opposite end to a surface aperture location 112 associated with the support 14. The cable is represented at 114 and includes a first intermediate end location 116 which is secured upon an angled tab 118 associated with the inner support 14, as well as a linearly translatable cable end 120 (disposed coaxially within an outer sheath defined at reference 114) secured to the lower extending portion 106 of the rotatable release 96.

Figure 3:
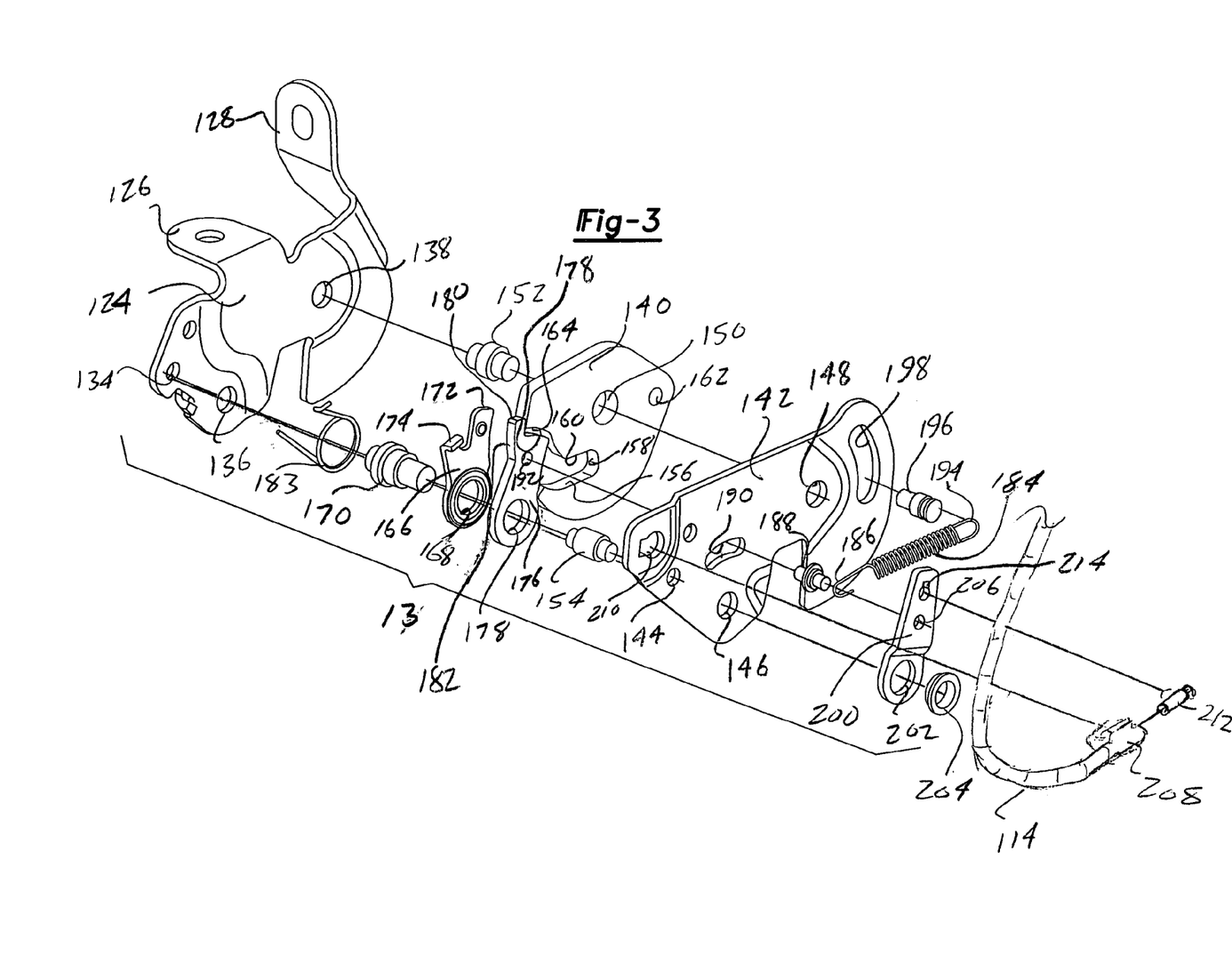
FIG. 3 is an exploded perspective of the floor release latch mechanism according to the present invention.

Referring now to FIG. 3, a description of the components associated with the floor release latch mechanism 13 will now be made. The floor release mechanism provides both secure and anti-chuck engagement of a striker 122 (see FIG. 1 and FIGS. 4–11), as well as controlled release and reengagement of the latch to and from the floor mounted striker. The floor release latch mechanism 13 is combined, and operable through, the release mechanism 12 associated with the pivotally engageable seat back.

The exploded illustration of FIG. 3, in cooperation with the succeeding views of FIGS. 4–7, illustrates the floor release latch mechanism 13 according to a preferred embodiment of the present invention. As previously described, the latch mechanism provides for easy disengagement of the vehicle seat and for pivoting to a forward dump position. Additionally, the construction of the latch mechanism facilitates easy reengagement of the seat to the striker.

The floor release latch mechanism 13 is secured to a side of a vehicle seat (not shown) and includes an inner support plate 124 exhibiting a typically planar support face to which is secured the various additional components of the latch mechanism. First and second mounting locations 126 and 128 are defined by angled end portions of the support plate 124 and which, with the provision of mounting bolts, secure to associated locations of the vehicle seat and typically a lowermost location of the seat frame as defined by frame member 130 illustrated in plan view in FIG. 1. The support plate 124, in addition to the remaining components of the floor latch assembly, is constructed of a durable steel grade material which provides the necessary properties of strength and durability.

The floor mounted striker bar 122, as referenced in each of the overall environment views of FIGS. 4–7 and associated sectional views of FIGS. 8–11, cooperate with the floor latch assembly 14 to pivotally secure the seat to the floor 132 of the vehicle interior. The inner support plate 124 further includes a plurality of apertures 134, 136 and 138 positioned at given spaced locations, the purpose of which will be subsequently explained.

A latch plate 140 is rotatably secured between the inner support plate 124 and a spaced apart outer support plate 142. For purposes of ease of illustration, the outer support plate 142 is shown transparently in the succeeding views of FIGS. 4–7 and to better illustrate the operations of the floor latch release between the fully engaged and fully disengaged positions. The outer support plate 142 includes an additional set of apertures 144, 146 and 148, which are in substantial alignment with the plurality of apertures 134, 136 and 138 associated with the inner support plate 124.

The latch plate 140 includes an aperture 150, positioned in alignment with the apertures 138 and 148 associated with the inner 124 and outer 142 support plates. A rivet 152 secures the latch plate 140 in pivoting fashion between the support plates 124 and 142. A further rivet 154 is illustrated and which aligns and secures within apertures 134 and 144 in plates 124 and 142 in order to maintain the plates in a spatially arrayed fashion.

The latch plate 140 includes an arcuate extending inner configuration, see as illustrated by extending and interconnected surfaces 156, 158 and 160, and which collectively define an extended recess within the latch plate 140 for receiving the crosswise extending portion of the striker bar 122 in an engaged position. Additional features of the latch plate 140 include an aperture 162, located towards an end of the latch plate body and spaced from its pivot point (aperture 150), as well as a support surface 164 located proximate the striker receiving arcuate configuration defined by interconnecting surfaces 156, 158 and 160.

A first cam 166 is provided and includes a central aperture 168. The cam 166 is positioned in overlapping fashion relative to the apertures 136 and 146 of the inner 124 and outer 142 plates and such that a cam pivot 170 passes therethrough to rotatably secure the cam 166 between the support plates 124 and 142 in a positioned fashion relative to the latch plate 140.

The first cam 166, also referenced as a first anti-chuck cam portion, includes a shoulder 172 which seats, or abuts, against the support surface 164 associated with the latch plate 140 in the engaged position. As will be discussed subsequently, the circular aperture 168 of the first cam 166 is rotatably seated on an associated rounded portion of the cam shaft 170 and, accordingly, is not fixedly, but freely, rotatable relative to the shaft 170.

An angled bracket 174 is associated with the first cam 166 and extends in a direction such that it overlaps and engages against an edge surface of a second cam 176 having a rounded aperture 178 and which is mounted to the cam pin 170 such that the first cam 166 and second cam 176 are rotatable about the same axial center line. The second cam 176 includes a secondary shoulder 178 which abuts (loosely in comparison to the primary anti-chuck shoulder 172 of the first cam element 166) against the latch plate support surface 164. Extending portion 180 of second cam 176 defines an abutment stop against the latch plate 142 and a further intermediate edge location 182 of the second cam 178 defines a surface against which the angled bracket 174 of the first cam 166 abuts. An anti-chuck cam spring is illustrated at 183 which seats against the inner plate 124 and includes a curled edge engageable against the cam 166, in a clockwise fashion, and likewise to bias both the cam 166 and the adjoining cam 176, including their respective shoulder portions 172 and 178, against the latch plate support surface 164.

A coil spring 184 includes a first end 186 engaging a pin lever 188, which is in turn secured through an apertured and arcuate channel 190 defined in the outer plate 142 and engageable with the second cam 176 by an aperture 192 located in the cam 176. An opposite extending second end 194 of the spring 184 secures to a pin 196, in turn inserting through an arcuate slot 198 formed in an opposite end surface of the outer plate 142 and secured to aperture 162 defined in the latch plate 142.

A lever 200 includes an aperture 202 and through which is inserted the cam pin 170, with the assistance of a bushing 204, and in order to seat the lever 200 over a projecting end of the cam pin and in order to position the lever 200 upon an exterior face of the plate 142. The lever 200 is pivotally slaved to the cam element 176 (and by virtue of the angled tab 174 to the adjoining cam element 166) by an aperture 206 which engages an opposite end of the pin lever 188 slaved to the arcuate slot 190 defined in the outer plate 142.

An opposite end of the translatable cable 114 is illustrated in FIG. 3 and includes a first intermediate end location 208 secured to an exterior facing surface location 210 of the plate 142. A linearly translatable end 212 of the cable 114 secures to an outermost location 214 of the floor release lever 200.

In this fashion, and as will now be described in reference to the operational views of FIGS. 4–7, the floor release mechanism 13 is operative in response to the actuation of the seat back mechanism 12, by virtue of the interconnecting cable 114, in order to release the latch 140 from the striker bar 122 and to permit the seat to pivot about a spring biased and forward end location, see at 216 in FIG. 1, established between the seat and the vehicle, this again occurring following the seat back arm 20 causing the vehicle seat back to pivot to the forward stowed location.

Figure 4:
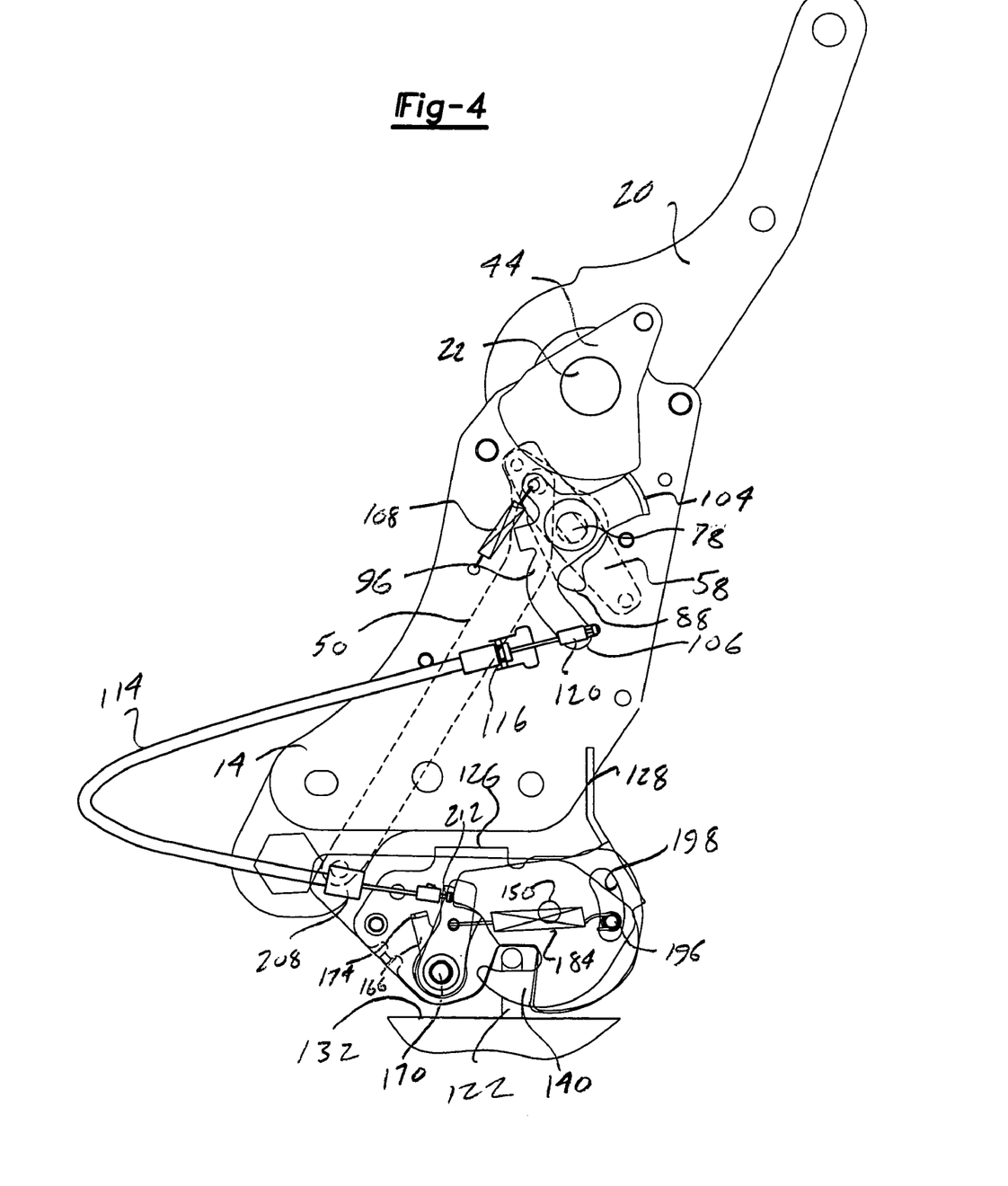
FIG. 4 is an enlarged side plan view of the present invention, as substantially illustrated in FIG. 1, and in a fully engaged and upright position.
Figure 5:
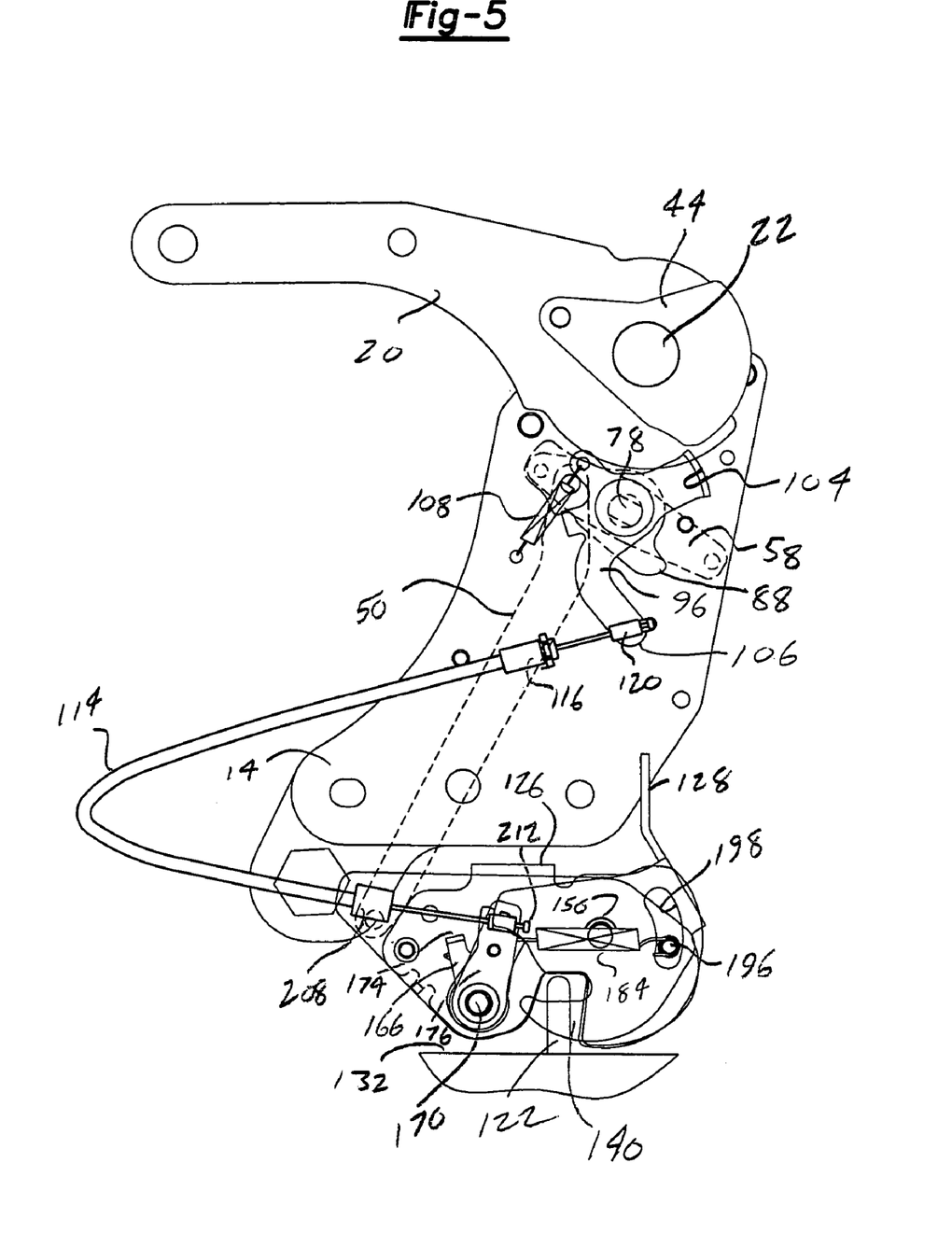
FIG. 5 is a succeeding plan view to that shown in FIG. 4 and illustrating a first intermediate disengagement condition by which rotation of the seat back lever causes the seat back to pivot to a forward position relative to the seat bottom.

In operation, and as initially shown in FIG. 4, the seat back and seat bottom are illustrated in their fully engaged position. At this point, and now referencing the first disengagement view of FIG. 5, the seat back lever 58 is actuated in a direction opposite that of its spring bias (see again arrow 76 in FIG. 2), whereby the intermediately disposed cam element 88, located between the inner 14 and outer 16 support plates and in abutting engagement with the pivotally secured seat back arm 20 in its upright position, is likewise caused to rotate. The projecting ledge 92 associated with the cam 88 acts upon the tab location 100 of the release 96, causing the release 96, again located on an opposite face of the inner support 14, to rotate in a direction whereby associated end 120 of the cable 114 is caused to actuate outwardly from the fixed and sheath exterior.

FIG. 5 again illustrates the end abutment shoulder 104 of the release 96 being caused to rotate out of abutting contact with the lock plate 44, as a result of the initial rotating motion imparted to the release 96 by the lever 58 and associated linkage 50, thus causing the slave seat back arm 20 to pivot forwardly to the stowed position relative to the seat bottom. To confirm, and throughout the range of motion exerted on the seat back mechanism 12 in FIG. 4, no actuation is translated to the floor release mechanism 13. Prior to being actuated by the seat back mechanism 12 (such as will be described in reference to FIGS. 6 and 7) the floor latch release mechanism 13 retains the latch plate 140 in engaged position about the floor mounted striker bar 122.

Figure 6:
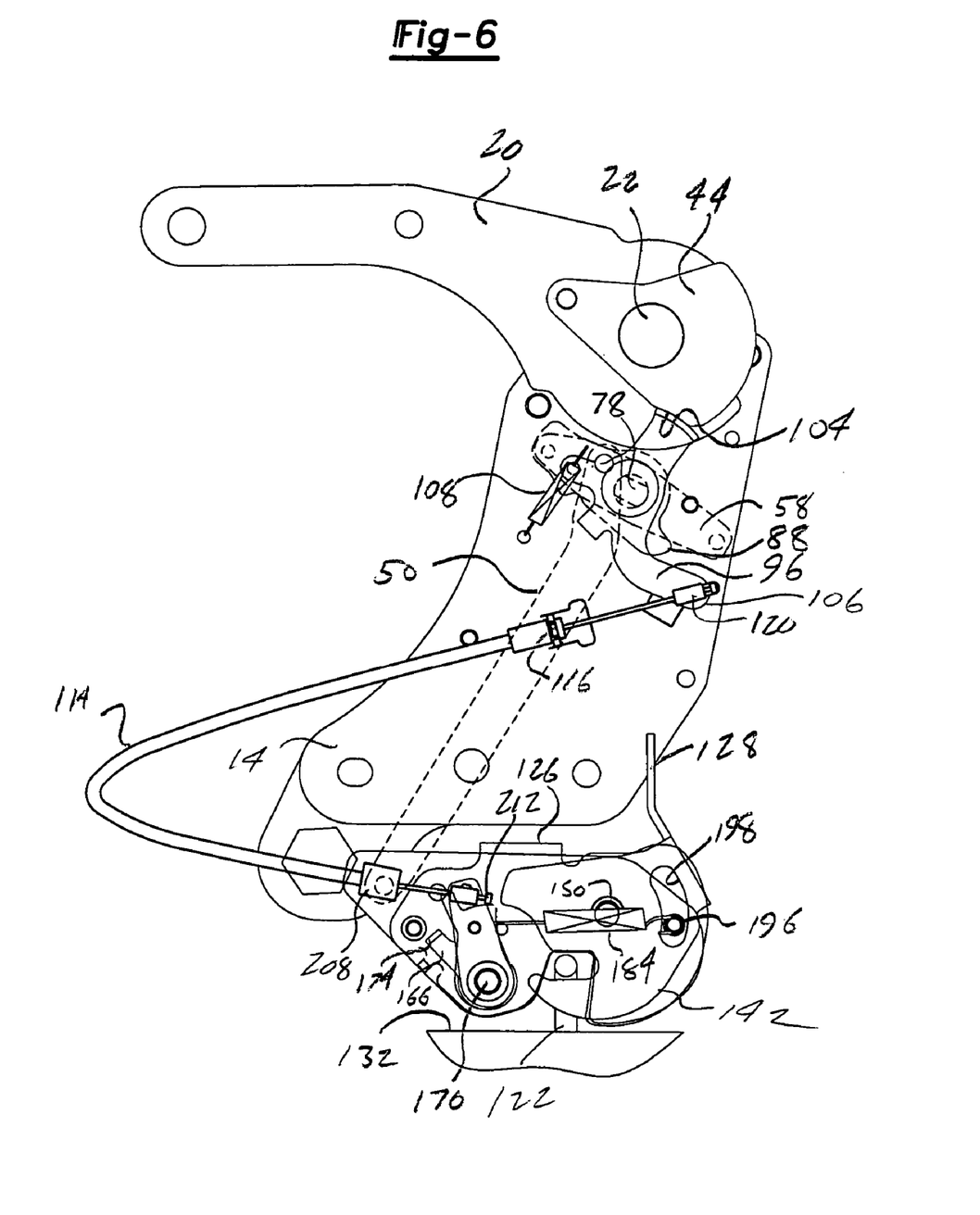
FIG. 6 is a further succeeding plan view and illustrating a succeeding disengagement condition by which continued rotation of the seat back lever causes the rotatably slaved seat back release to linearly translate the extending cable extending to the floor latch release lever, at which point primary and secondary cams slaved to the floor lever are caused to rotate away from an associated latch plate.

Referring now to FIG. 6, the further succeeding plan view illustrates a succeeding disengagement condition and by which continued rotation of the seat back lever 58 causes the rotatably slaved seat back release 96 to further linearly translate its secured end 120 of the extending cable 114, such that the opposite translating end 212 secured to the seat back lever 200 is now caused to rotate (in a CCW) direction away from the latch plate 140. In this condition, the release 96 is caused to further rotate, and such that its associated coil spring 108 acts upon engagement location 110 and causes the release tab 100 to fully traverse within the arcuate channel 102 defined in the outer support plate 14. This in turn causes the end abutment shoulder 104 of the release 96 to abut a side edge location of the lock plate 44 (again FIG. 6) and by which the seat back arm 20 is now prevented from being rotated to an opposite and upright condition relative to the seat bottom.

Referencing again FIG. 6 in relation to the floor release latch mechanism, the (inwardly withdrawing) motion of the cable, see end 212 relative to outer fixed sheath 114, a successive and partially disengaging view of the floor is illustrated, and by which lever 200 is actuated in the ccw direction. At this point, the cam 176 is actuated against the biasing force exerted by the anti-chuck cam spring 183, and by which its associated shoulder 178 is pivoted away from the support surface 164 of the latch plate 142, while at the same time the primary support shoulder 172 of the anti-chuck cam 166 is likewise drawn, or rotated, away from abutting engagement with the support surface 164 by virtue of the edge surface 182 of the cam 176 acting upon the tab 174 of the associated cam 166 to pivot both cams away from the latch plate 142.

Figure 7:
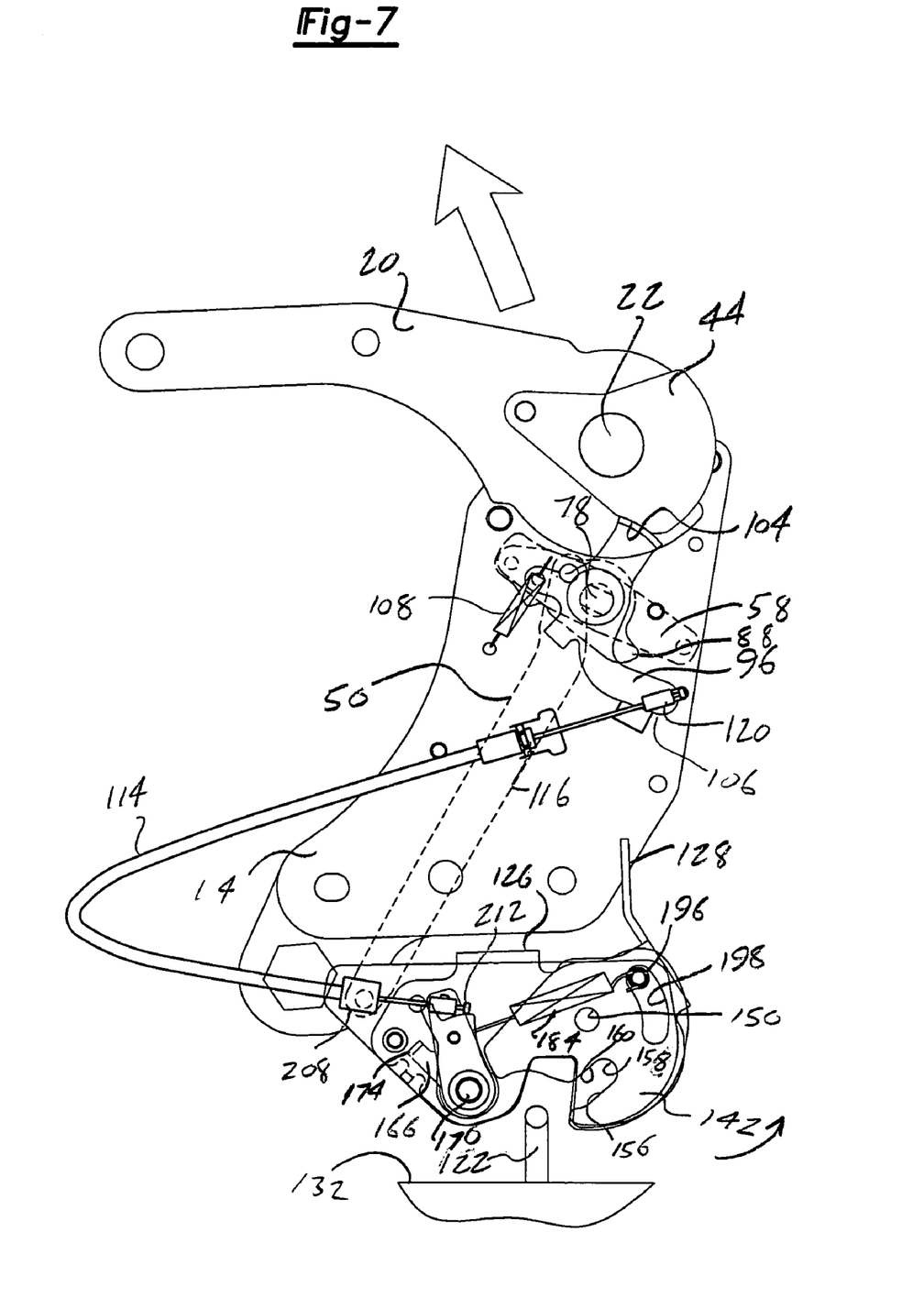
FIG. 7 is a yet further succeeding plan view illustrating the floor latch mechanism in a fully released and forward dump condition and by which the latch plate is allowed to rotate free from the floor mounted striker.

As further shown in FIG. 7, the floor latch mechanism is now illustrated in a fully released and forward dump condition and by which the latch plate 142 is allowed to rotate free from the floor mounted striker 122 in a counterclockwise direction. This is due to the forward pivoting bias exerted upon the seat bottom along its axial front end location 216 (again FIG. 1). As is also known, the seat may include a spring-bias to influence the latch assembly to a disengaging position. Alternatively, the seat may be manually tilted to the forward dump position.

In its fully disengaged condition, the disengaging force of the striker bar 122, acting on the latch plate 140, causes the plate 140 to continue to rotate in the ccw (FIG. 7). As the latch plate 140 continues to rotate, the tension exerted on the spring 184 increases and to the point in which the pin mounting location 196 of the spring end 194 (see again FIGS. 3 and 7) passes over center of the pivotal mounting location (see arcuate channel 198).

Upon passing the over center position, a reverse compression force on the spring 184 causes the latch plate 142 to be complete its pivot to a fully open (disengaged) position and by which the striker bar 122 is permitted to unseat from the arcuate configuration associated with the latch plate 28. The seat is then permitted to freely pivot to its forward dump position, and with the latch plate 142 remaining in a fully opened position.

When it is desired to reengage the floor latch mechanism 13 with the striker bar 18, the seat is forcible pivoted rearwardly, and until such time as the striker contacts the inner contour of the arcuate configuration. At this point, a reverse of the illustrations of FIGS. 4–7 occurs and by which the latch plate 142 is reengaged in a clockwise direction. The spring 184 passes over center once again to the position of FIG. 4, and results in the first and second cams 166 and 176 being successively drawn back into engagement with the support surface 164 of the latch plate 142.

Concurrently, a reverse (inward) translation exerted on the associated end 120 of the cable 114, and in a direction towards its fixed outer sheath, causes a reverse rotation of the release 96, and by which the end shoulder 104 is drawn away from abutting contact with the lock plate 44. At this point, the seat back arm 20 may be manually repositioned to its upwardly extending position of FIG. 1, and against the biasing force of the clock spring 32.

Having described our invention, other and additional preferred embodiments will become apparent to those skilled in the art to which it pertains, and without deviating from the scope of the appended claims.

The invention claimed is:

1. A release mechanism for use with a seat having a seat back and a seat bottom, the seat bottom being engaged to a striker associated with a vehicle floor, said mechanism comprising:
    a seat back cam engaging the seat back in an upright position, a seat back lever actuating said cam to permit the seat back to rotate to a forwardly stowed position relative to the seat bottom;
    a release pivotally slaved to said cam element, a first end of a linearly translatable cable securing to said release;
    a support plate secured to the seat bottom proximate to the floor supported striker;
    a latch plate rotatably secured to said support plate, an arcuate configuration defined in said latch plate defining a recess for receiving the striker in an engaged position;
    at least one floor release cam rotatably securing to a further location associated with said support plate, a shoulder defined in said cam seating against a support surface of said latch plate, said at least one floor release cam further comprising first and second overlapping cams which define primary and secondary abutment shoulders biasing against said latch plate support surface in an engaged position;
    an opposite extending end of said linearly translatable cable engaging a floor release lever slaved to said at least one floor release cam; and
    said cam being actuated to rotate in a direction away from said latch plate, a resultant spring bias exerted upon said latch plate causing said latch plate to rotate relative to the striker to a fully disengaged position.

2. The release mechanism as described in claim 1, said support plate comprising an inner plate, an outer plate pivotally supporting said latch plate and said first and second floor cam members in sandwiching fashion relative said inner plate.

3. The release mechanism as described in claim 2, further comprising an arcuate slot defined in said outer plate, a pin inserting through said slot and securing to said latch plate, said spring further comprising a coil spring with an end connected to said pin.

4. The release mechanism as described in claim 2, further comprising a rivet for rotatably securing said latch plate between said inner and outer plates.

5. A floor release latch for use with a vehicle seat, comprising:
    a latch plate rotatably secured to the seat and exhibiting a recess adapted to engage a floor mounted striker;
    a first cam rotatably secured to the seat and defining a shoulder seating against a support surface associated with said latch plate;
    a second cam secured in coaxial fashion relative to said first cam;
    a linearly translatable cable communicating with a floor release lever, in turn actuating said cam in an unseating direction away from said support surface; and
    a coil spring extending between said first cam and a location of said latch plate offset from its pivot point of rotation;
    a resultant spring bias exerted upon said latch plate by said coil spring causing said latch plate to further rotate in a disengaging direction relative to the striker and upon said coil spring exceeding an over center portion relative to said pivot point of rotation of said latch plate.

6. The release latch as described in claim 5, said first and second cams exhibiting primary and secondary abutment shoulders positioned proximate said support surface.

7. The release latch as described in claim 5, further comprising an inner plate and an outer plate sandwiching said first and second cams and said latch plate therebetween, said lever and said coil spring securing upon an exposed face of said outer plate.

8. The release latch as described in claim 7, further comprising an arcuate slot defined in said outer plate, a pin inserting through said slot and securing to said latch plate, said spring further comprising a coil spring with an end connected to said pin.

9. A release mechanism for use with a seat having a seat back and a seat bottom, the seat bottom being engaged to a striker associated with a vehicle floor, said mechanism comprising:
- a seat back operated by a seat back lever to rotate to a forwardly stowed position relative to the seat bottom;
- the seat back further comprising a seat back arm rotatably secured between inner and outer supports, a seat back cam likewise being rotatably secured between said inner and outer supports and defining a projecting ledge portion engaging a corresponding recessed curvature defined in a lower arcuate location of the seat back arm in an upright position;
- a release component pivotally slaved to said seat back lever, a first end of a linearly translatable cable securing to said release;
- a support plate secured to the seat bottom proximate to the floor supported striker;
- a latch plate rotatably secured to said support plate, an arcuate configuration defined in said latch plate defining a recess for receiving the striker in an engaged position;
- at least one floor release cam rotatably securing to a further location associated with said support plate, a shoulder defined in said cam seating against a support surface of said latch plate;
- an opposite extending end of said linearly translatable cable exerting a force to said floor release cam, causing said cam to rotate in a direction away from said latch plate, said latch plate being caused to rotate relative to the striker to a fully disengaged position.

10. The release mechanism as described in claim 9, further comprising a linkage member interconnecting said seat back lever with a spline lever secured to said inner seat back support.

11. The release mechanism as described in claim 10, further comprising a lock plate slaved to the seat back arm and disposed on an exterior surface of said outer support, a shoulder of said release abutting a side edge location of said lock plate to maintain said seat back arm in said forwardly stowed position.

12. The release mechanism as described in claim 9, further comprising a clock spring for biasing said seat back lever and said seat back cam in an abutting condition against the seat back arm.

13. The release mechanism as described in claim 11, further comprising a coil spring extending from said release to said outer seat back support, said coil spring biasing said release in a fully rotated position to maintain said release shoulder against said lock plate.

14. A release mechanism for use with a seat having a seat back and a seat bottom, the seat bottom being engaged to a striker associated with a vehicle floor, said mechanism comprising:
- a seat back cam engaging the seat back in an upright position, a seat back lever actuating said cam to permit the seat back to rotate to a forwardly stowed position relative to the seat bottom;
- the seat back further comprising a seat back arm rotatably secured between inner and outer supports, said seat back cam likewise being rotatably secured between said inner and outer supports and defining a projecting ledge portion engaging a corresponding recessed curvature defined in a lower arcuate location of the seat back arm;
- a release pivotally slaved to said cam element, a first end of a linearly translatable cable securing to said release;
- a support plate secured to the seat bottom proximate to the floor supported striker;
- a latch plate rotatably secured to said support plate, an arcuate configuration defined in said latch plate defining a recess for receiving the striker in an engaged position;
- at least one floor release cam rotatably securing to a further location associated with said support plate, a shoulder defined in said cam seating against a support surface of said latch plate;
- an opposite extending end of said linearly translatable cable engaging a floor release lever slaved to said at least one floor release cam; and
- said cam being actuated to rotate in a direction away from said latch plate, a resultant spring bias exerted upon said latch plate causing said latch plate to rotate relative to the striker to a fully disengaged position.

15. The release mechanism as described in claim 14, further comprising a linkage member interconnecting said seat back lever with a spline lever secured to said inner seat back support.

16. The release mechanism as described in claim 14, further comprising a lock plate slaved to the seat back arm and disposed on an exterior surface of said outer support, a shoulder of said release abutting a side edge location of said lock plate to maintain said seat back arm in said forwardly stowed position.

17. The release mechanism as described in claim 16, further comprising a coil spring extending from said release to said outer seat back support, said coil spring biasing said release in a fully rotated position to maintain said release shoulder against said lock plate.

18. A release mechanism for use with a seat having a seat back and a seat bottom, the seat bottom being engaged to a striker associated with a vehicle floor, said mechanism comprising:
- a seat back cam engaging the seat back in an upright position, a seat back lever actuating said cam to permit the seat back to rotate to a forwardly stowed position relative to the seat bottom;
- a clock spring biasing said seat back lever and said seat back cam in an abutting condition against a seat back arm;
- a release pivotally slaved to said cam element, a first end of a linearly translatable cable securing to said release;
- a support plate secured to the seat bottom proximate to the floor supported striker;
- a latch plate rotatably secured to said support plate, an arcuate configuration defined in said latch plate defining a recess for receiving the striker in an engaged position;

at least one floor release cam rotatably securing to a further location associated with said support plate, a shoulder defined in said cam seating against a support surface of said latch plate;

an opposite extending end of said linearly translatable cable engaging a floor release lever slaved to said at least one floor release cam; and said cam being actuated to rotate in a direction away from said latch plate, a resultant spring bias exerted upon said latch plate causing said latch plate to rotate relative to the striker to a fully disengaged position.

* * * * *

UNITED STATES PATENT AND TRADEMARK OFFICE
CERTIFICATE OF CORRECTION

PATENT NO.       : 7,198,316 B2                                        Page 1 of 1
APPLICATION NO.  : 11/120364
DATED            : April 3, 2007
INVENTOR(S)      : Tavis Lutzka et al.

It is certified that error appears in the above-identified patent and that said Letters Patent is hereby corrected as shown below:

Column 2, line 36, replace "A longitudinal links" with -- A longitudinal link --

Column 9, line 40, replace " to be complete" with -- to complete --

Signed and Sealed this

Seventh Day of August, 2007

JON W. DUDAS
*Director of the United States Patent and Trademark Office*